United States Patent [19]

Hush

[11] Patent Number: 5,642,017

[45] Date of Patent: Jun. 24, 1997

[54] MATRIX-ADDRESSABLE FLAT PANEL FIELD EMISSION DISPLAY HAVING ONLY ONE TRANSISTOR FOR PIXEL CONTROL AT EACH ROW AND COLUMN INTERSECTION

[75] Inventor: Glen E. Hush, Boise, Id.

[73] Assignee: Micron Display Technology, Inc., Boise, Id.

[21] Appl. No.: 284,762

[22] Filed: Aug. 2, 1994

Related U.S. Application Data

[63] Continuation-in-part of Ser. No. 209,579, Mar. 11, 1994, Ser. No. 60,111, May 11, 1993, abandoned, Ser. No. 102,598, Aug. 5, 1993, abandoned, Ser. No. 77,181, Jun. 15, 1993, Pat. No. 5,410,218, and Ser. No. 138,535, Oct. 15, 1993, abandoned.

[51] Int. Cl.⁶ .................... H01J 17/36; H05B 41/36
[52] U.S. Cl. .................. 315/169.3; 345/74; 315/350; 315/334; 313/336
[58] Field of Search ............................ 345/74, 75, 92, 345/55; 315/169.1, 349, 169.4, 169.3, 350, 334, 56; 313/309, 336

[56] References Cited

U.S. PATENT DOCUMENTS

| | | | |
|---|---|---|---|
| 4,940,916 | 7/1990 | Borel et al. | 313/306 |
| 4,975,691 | 12/1990 | Lee | 315/169.3 X |
| 5,015,912 | 5/1991 | Spindt et al. | 315/169.3 X |
| 5,075,596 | 12/1991 | Young et al. | 315/169.3 |
| 5,162,704 | 11/1992 | Kobori et al. | 315/349 |
| 5,210,472 | 5/1993 | Casper et al. | 315/349 |
| 5,359,256 | 10/1994 | Gray | 313/169 |
| 5,363,225 | 11/1994 | Minamihara et al. | 345/92 X |
| 5,475,396 | 12/1995 | Kitajima et al. | 345/92 |

*Primary Examiner*—Robert Pascal
*Assistant Examiner*—Arnold Kinkead
*Attorney, Agent, or Firm*—Angus C. Fox III; Robert J. Stern

[57] ABSTRACT

This invention is a space-efficient pixel control circuit for a field emission flat panel matrix-addressable array display. The invention reduces by one the number of transistors required at the intersection of each row line and column line within the array. In addition, only two lines need be routed through the array (i.e., row and column). The array space saved by increased layout efficiency may be used to increase pixel density within the array. The new space-efficient pixel control circuit has a single transistor in a base electrode grounding path that is directly controlled by a row line. A current-limiting resistor is interposed between the single grounding transistor and a column line to which an inverse video signal is applied. The magnitude of the current through the current-limiting resistor is inversely proportional to the inverse column signal voltage. Thus, pixel brightness is directly proportional to the voltage drop across the current-limiting resistor.

8 Claims, 2 Drawing Sheets

MATRIX-ADDRESSABLE FLAT PANEL FIELD EMISSION DISPLAY HAVING ONLY ONE TRANSISTOR FOR PIXEL CONTROL AT EACH ROW AND COLUMN INTERSECTION

This invention was made with Government support under Contract no. DABT63-93-C-0025 awarded by Advanced Research Projects Agency ("ARPA"). The Government has certain rights in this invention.

This application is a continuation-in-part of the following U.S. patent applications: Ser. No. 08/209,579 filed Mar. 11, 1994; Ser. No. 08/060,111 filed May 11, 1993, now abandoned; Ser. No. 08/102,598 filed Aug. 5, 1993, now abandoned; Ser. No. 08/077,181 filed Jun. 15, 1993, now U.S. Pat. No. 5,410,218; and Ser. No. 08/138,535 filed Oct. 15, 1993, now abandoned.

FIELD OF THE INVENTION

This invention relates to matrix-addressable flat panel displays and, more particularly, to a field emission display in which a single transistor located at each row and column intersection controls pixel activation. The invention lends itself to an architecture wherein row and column signal voltages that are compatible with standard integrated circuit logic levels, control a much higher pixel activation voltage.

BACKGROUND OF THE INVENTION

For more than half a century, the cathode ray tube (CRT) has been the principal device for displaying visual information. Although CRTs have been endowed during that period with remarkable display characteristics in the areas of color, brightness, contrast and resolution, they have remained relatively bulky and power hungry. The advent of portable computers has created intense demand for displays which are lightweight, compact, and power efficient. Although liquid crystal displays are now used almost universally for laptop computers, contrast is poor in comparison to CRTs, only a limited range of viewing angles is possible, and in color versions, they consume power at rates which are incompatible with extended battery operation. In addition, color screens tend to be far more costly than CRTs of equal screen size.

As a result of the drawbacks of liquid crystal display technology, thin film field emission display technology has been receiving increasing attention by industry. Flat panel display utilizing such technology employ a matrix-addressable array of pointed, thin-film, cold field emission cathodes in combination with a phosphor-luminescent screen. Somewhat analogous to a cathode ray tube, individual field emission structures are sometimes referred to as vacuum microelectronic triodes. The triode elements are a cathode (emitter tip), a grid (also referred to as the gate), and an anode (typically, the phosphor-coated element to which emitted electrons are directed).

Although the phenomenon of field emission was discovered in the 1950's, extensive research by many individuals, such as Charles A. Spindt of SRI International, improved the technology to the extent that prospects for its use in the manufacture of inexpensive, low-power, high-resolution, high-contrast, full-color flat displays appeared promising. Realizing that field emission technology was no longer a technology that should be relegated to the care of scientists interested primarily in pure research, a dozen or so companies joined the race to develop a practical flat panel field emission display.

Conventional field emission displays are constructed such that a column signal activates a single conductive strip within the grid, while a row signal activates a conductive strip within the emitter base electrode. At the intersection of an activated column and an activated row, a grid-to-emitter voltage differential sufficient to induce field emission will exist, causing illumination of an associated phosphor on the phosphorescent screen. There are a number of problems associated with this conventional matrix-addressable field-emission display architecture. In order for field emission to occur, the voltage differential between a row conductor and a column conductor must be at least equal to a voltage which will provide acceptable field emission levels. Field emission intensity is highly dependent on several factors, the most important of which is the sharpness of the cathode emitter tip and the intensity of the electric field at the tip. Although a level of field emission suitable for the operation of flat panel displays has been achieved with emitter-to-grid voltages as low as 60 volts (and this figure is expected to decrease in the coming years due to improvements in emitter structure design and fabrication) emission voltages will probably remain far greater than 5 volts, which is the standard CMOS, NMOS, and TTL "1" level. Thus, if the field emission threshold voltage is at 60 volts, row and column lines will, most probably, be designed to switch between 0 and either +30 or −30 volts in order to provide an intersection voltage differential of 60 volts. Hence, it will be necessary to perform high-voltage switching as these row and column lines are activated. Not only is there a problem of building drivers to switch such high voltages, but there is also the problem of unnecessary power consumption because of the capacitive coupling of row and column lines. That is to say, the higher the voltage on these lines, the greater the power required to drive the display.

In addition to the problem of high-voltage switching, conventional field emission displays are also prone to low yield and low reliability due to the possibility of emitter-to-grid shorts. Such a short affects the voltage differential between the emitters and grid within the entire array, and may well render the entire array useless, either by consuming so much power that the supply is not able to maintain a voltage differential sufficient to induce field emission, or by actually generating so much heat that a portion of the array is actually destroyed.

A field emission display architecture, which is the subject of U.S. Pat. No. 5,210,472, overcomes the problems of high-voltage switching and emitter-to-grid shorts, which, in turn, ameliorates the problem of display power consumption. The new architecture (hereinafter referred to as the "dual series-coupled transistor, low-voltage-switching field emission display architecture") permits the switching of a high pixel activation voltage with low signal voltages that are compatible with standard CMOS, NMOS, or other integrated circuit logic levels. Instead of having rows and columns tied directly to the cathode array, they are used to gate at least one pair of series-connected field effect transistors (FETs), each pair when conductive coupling the base electrode of a single emitter node to a potential that is sufficiently low, with respect to a higher potential applied to the grid, to induce field emission. Each row-column intersection (i.e. pixel) within the display may contain multiple emitter nodes in order to improve manufacturing yield and product reliability. In a preferred embodiment, the grid of the array is held at a constant potential ($V_{FE}$), which is consistent with reliable field emission when the emitters are at ground potential. A multiplicity of emitter nodes are employed, one or more of which correspond to a single pixel (i.e., row and column intersection). Each emitter node has its own base electrode, which is groundable through its own pair of series-coupled field-effect transistors by applying a signal voltage to both the row and column lines associated with that emitter node. One of the series-connected FETs is gated by a signal on the row line; the other FET is gated by a signal on the column line. Also in the preferred embodiment of the invention, each emitter node contains multiple cathode emitters. Hence, each row-column intersection controls multiple pairs of series-coupled FETs, and each pair controls a single emitter node (pixel) containing multiple emitters.

The regulation of cathode-to-grid current has become a major issue in the design of field emission displays, as the issues of cathode life expectancy, low power consumption, and stability requirements are addressed.

The issue of current regulation has been addressed with respect to conventionally constructed flat panel field emission displays, such as the one depicted in FIG. 1. For example, in U.S. Pat. No. 4,940,916, Michel Borel and three colleagues disclose a field emission display having a resistive layer between each cathode (emitter tip) and an underlying conductive layer. In a subsequent U.S. Pat. No. 5,162,704, Yoichi Bobori and Mitsuru Tanaka disclose a field emission display having a diode in series with each emitter tip.

In U.S. patent application Ser. No. 08/011,927, now issued as U.S. Pat. No. 5,357,172, a method is disclosed for reducing power consumption and enhancing reliability and stability in the low-voltage switching field emission display architecture by regulating cathode emission current. This is achieved by placing a resistor in series with each pair of series-coupled low-voltage switching MOSFETs. As heretofore explained, each MOSFET pair couples an emitter node, which contains one or more field emitter tips, to ground. The resistor is coupled directly to the ground bus and to the source of the MOSFET furthest from the emitter node. By coupling the current-regulating resistor directly to the ground bus, stable current values independent of cathode voltage are achieved over a wide range of cathode voltages.

A functional, monochrome, 1.75 cm-diagonal prototype of the dual, series-coupled low-voltage switching field emission display architecture, which incorporated the current-regulating resistors of U.S. Pat. No. 5,357,172 in the emitter-grounding circuits, was constructed in 1993 by Micron Display Technology, Inc. of Boise, Id. FIG. 1 is representative of the pixel control circuitry for a single emitter node of the monochrome prototype display. Ideally, each pixel within the display will have multiple emitter nodes so that if one node is defective, the pixel will still function. The circuitry is characterized by a conductive grid 11, which is maintained at a constant potential, $V_{GRID}$, a transparent screen 12, and a phosphorescent layer 13, which coats the screen. The grid 11, the screen 12, and the phosphorescent layer 13 are continuous throughout the entire display. The node is depicted as having only two field emission cathodes 14A and 14B (also referred to as emitter tips). In actuality, a larger number of cathodes is desirable, as illumination uniformity in the display is thereby enhanced. Each of the emitters 14A and 14B is connected to a base electrode 15 that is common to only the emitters of the emitter node. In order to induce field emission, base electrode 15 is grounded through a pair of series-coupled field-effect transistors Q1 and Q2 and current-regulating resistor R1. Resistor R1 is interposed between the source of transistor Q1 and ground. Transistor Q1 is gated by a row line RL, while transistor Q2 is gated by a column line CL. It should be noted that a functionally equivalent circuit is created if column line CL controls the gate of transistor Q1 and row line RL controls the gate of transistor Q2. Standard logic signal voltages for CMOS, NMOS, TTL and other integrated circuits are generally 5 volts or less, and may be used for both column and row line signals. A pixel is turned off (i.e., placed in a non-emitting state) by turning off either or both of the series-connected FETs (Q1 and Q2). From the moment that at least one of the FETs becomes non-conductive (i.e., the gate-to-source voltage $V_{GS}$ drops below the device threshold voltage $V_T$), electrons will continue to be discharged from the emitter tips corresponding to that pixel until the voltage differential between the base and the grid is just below emission threshold voltage. In order to improve yield and to minimize array power consumption, an optional fusible link FL is placed in series with the pull-down current path from base electrode 153 to ground via transistors Q1 and Q2. Fusible link FL may be blown during testing if a base-to-emitter short exists within that emitter group, thus isolating the shorted group from the rest of the array.

Although performance of the prototype display exceeded expectations in many respects, it was noted that, under certain operating conditions, unintended pixel emission occurred when the transistor nearest ground was turned "off" and the transistor nearest the emitter tip was turned "on". This phenomenon resulted in a low-intensity background glow over which desired images were superimposed. This problem is believed to be associated with the parasitic capacitance of the node between each pair of transistors in the pixel grounding path (hereinafter the intermediate node). The following sequence of events is the most likely cause of the phenomenon. The transistor nearest the emitter node is turned "off" by a low logic signal on its gate. Then, the transistor nearest ground is turned "off" by a low logic signal on its gate, resulting in the intermediate node being at ground potential. When the transistor nearest the emitter is then turned "on" by a high logic signal on its gate, the difference in potential between the emitter node and the grid is sufficient to cause field emission until the intermediate node has emitted a number of electrons sufficient to cause the difference in potential between the emitter node and the grid to drop below the emission threshold.

In 1994, Micron Display Technology, Inc. constructed a functional, color, 1.75 cm-diagonal prototype employing an improved two-transistor pixel control circuit that remedied the heretofore described unintended pixel emission phenomenon. The improved pixel control circuit, which is depicted in FIG. 2, places only a single transistor (the primary control transistor) QP in the grounding path. The problematic intermediate node is thus eliminated from the grounding path. The gate of transistor QP is controlled by a row line RL, which passes through a secondary pixel control transistor QS. Transistor QS, in turn, is controlled by a column line CL. Thus, only when both the signals on both row line RL and column line CL are high is the primary pixel control transistor QP in an "on" state. It should be noted that a functionally equivalent circuit is created if column line CL controls the gate of transistor QP and row line RL controls the gate of transistor QS. Capacitor C1, which is charged when signals on both row line RL and column line CL are high, retains pixel information between raster scans. The improved circuit, like the original dual, series-coupled transistor pixel control circuit, requires two transistors at the intersection of each row and column line in the display, and also requires the routing of three signal lines through the display array (i.e., row, column and ground).

SUMMARY OF THE INVENTION

This invention is a space-efficient pixel control circuit for a field emission flat panel matrix-addressable array display.

The invention reduces by one the number of transistors required at the intersection of each row line and column line within the array. In addition, only the row lines and column lines need be routed through the array, as the grid is common to the entire array and at a topographically higher level. The array space saved by increased layout efficiency may be used to increase pixel density within the array. The new space-efficient pixel control circuit is similar to the circuit of FIG. 2, in that it has a single transistor in the base electrode grounding path. The new control circuit is also similar to the circuit of FIG. 1, in that the single transistor in the grounding path is directly controlled by a row signal line. Unlike either the circuit of FIG. 1 or FIG. 2, instead of having the current-limiting resistor interposed between the single grounding transistor and the ground bus, it is interposed between the grounding transistor and a column line to which an inverse video signal is applied. The magnitude of the current through the current-limiting resistor is inversely proportional to the inverse video signal voltage. Thus, pixel brightness is directly proportional to the voltage drop across the current-limiting resistor (this, of course, presupposes that all emitter nodes pertaining to a given pixel are coupled to the same column line).

PREFERRED EMBODIMENT OF THE INVENTION

Figure 2:
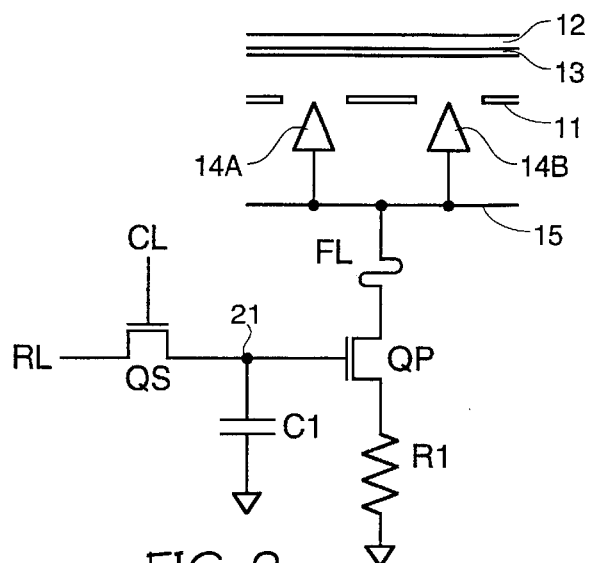
FIG. 2 is a schematic diagram of an improved low-voltage, two-transistor pixel control circuit for a flat-panel field emission display.
Figure 3:
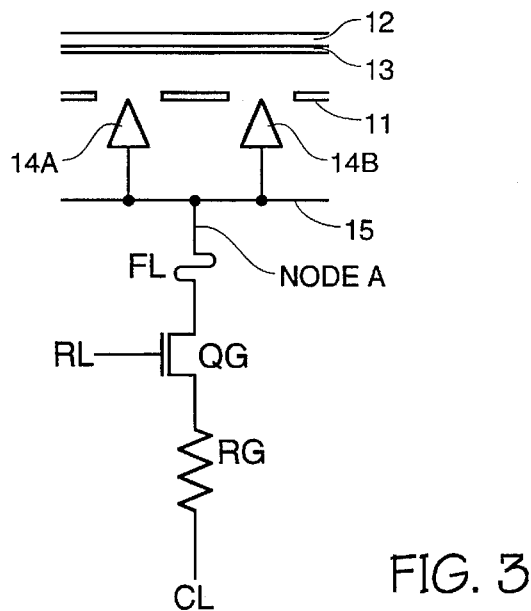
FIG. 3 is a schematic diagram of a new low-voltage one-transistor pixel control circuit for a flat-panel field emission display.

Referring now to FIG. 3, the new space-efficient pixel control circuit employs a single grounding transistor QG at the intersection of each row line RL and each column line CL. The screen 12, the phosphorescent coating 13 (for a color display, the phosphorescent coating 13 is actually a multiplicity of tiny red, green and blue dots), the grid 11, the base electrode 15, the emitter tips 14, and the fusible link FL are fundamentally unchanged from the related art circuits of FIG. 1 and FIG. 2. From a review of the schematic of FIG. 3, it will be evident that for circuit functionality, only the row signal lines and the inverse column signal lines must be routed within the array. As the grid is common to the entire display and at a higher level than the grounding circuitry, grid routing is not required.

Figure 1:
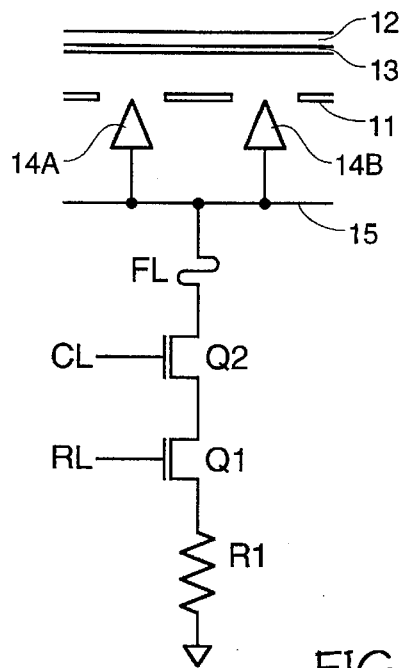
FIG. 1 is a schematic diagram of the original low-voltage, two-transistor pixel control circuit for a flat-panel field emission display.

Basic functionality of the circuit of FIG. 3 is much like that of the circuits of FIGS. 1 and 2. That is to say that the grid 11 is maintained at a constant first potential V1, which with current emitter technology can be as low as approximately 60 volts. If the field emission threshold voltage (the voltage at which the field emission cathodes or emitter tips just begin to emit) is 40 volts, then the threshold voltage at the emitter tips for this display will be 60 volts minus 40 volts, or 20 volts. That is to say that when a cathode is above 20 volts (also referred to herein as the second voltage V2), field emission is suppressed; conversely, when it is below 20 volts, field emission will occur. The less the potential on a cathode, the greater the intensity of emission. It should be noted that because of variation inherent in the manufacturing process, field emission threshold voltage varies somewhat from cathode to cathode. In any case, each field emission cathode will be at a potential of greater than approximately 20 volts during periods of pixel inactivation, and at a potential of less than approximately 20 volts during periods of pixel activation. From the moment that transistor QG becomes non-conductive (i.e., the gate-to-source voltage $V_{GS}$ drops below the device threshold voltage $V_T$), electrons will continue to be discharged from the cathodes or emitter tips corresponding to that pixel until the voltage on those cathodes is greater than approximately 20 volts. Pixel activation is somewhat more complex and will be discussed below.

Still referring to FIG. 3, when transistor QG is turned "on" and held at a fixed voltage by a high logic signal on row line RL, node A remains at a fixed voltage. An analog inverse-video signal SC* is applied to column line CL for an interval during a scan of the display array. With a fixed resistance of resistor RG and a fixed voltage drop across resistor RG, a constant field emission current is produced at emitter tips 14A and 14B. As the magnitude of the emitter current is inversely proportional to the voltage applied to the column line CL, the voltage on column line CL can be varied to produce different gradations of pixel brightness. Assuming that phosphor response is a linear function, it follows that pixel brightness is directly proportional to the voltage drop across resistor RG.

Figure 4:
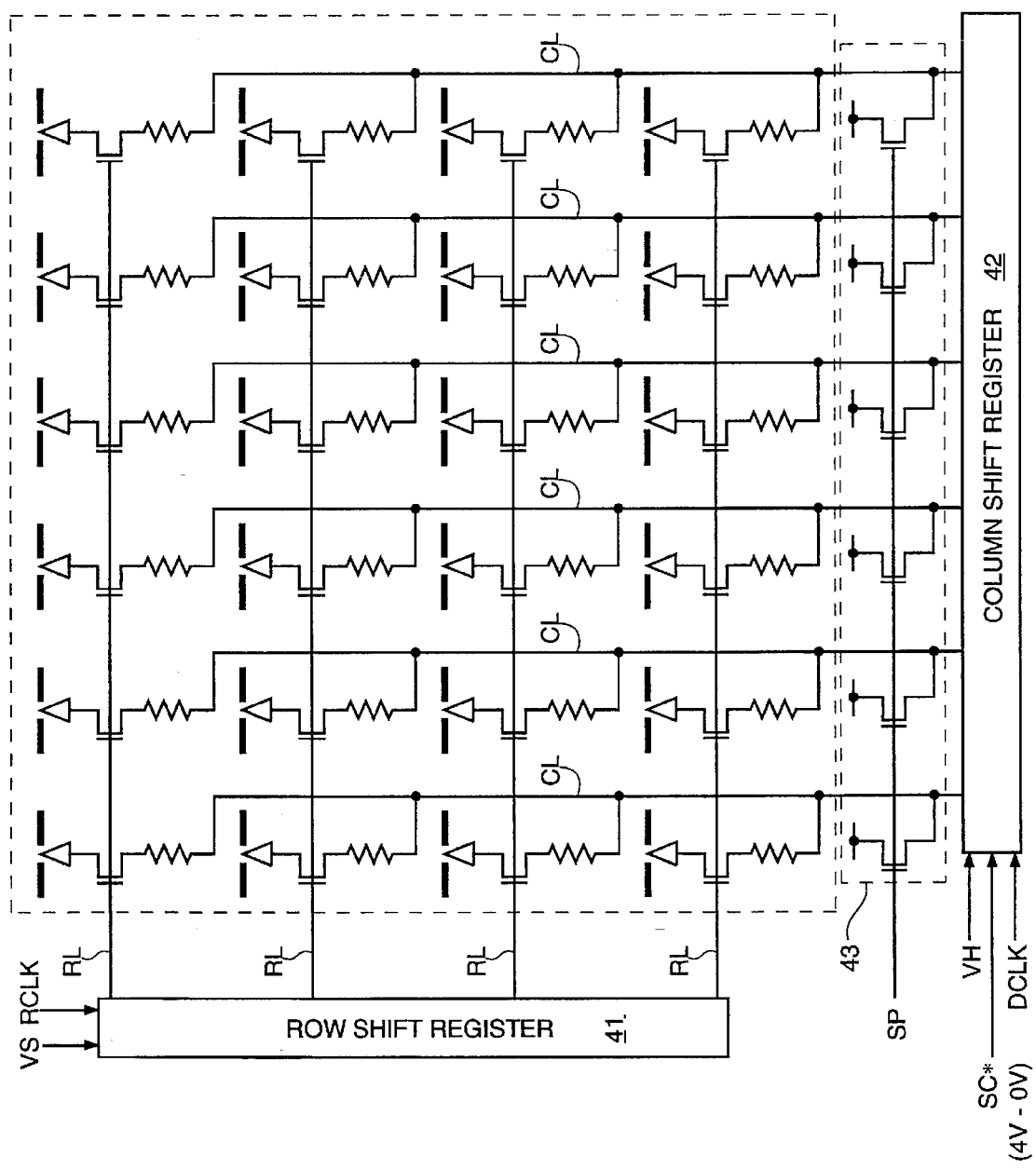
FIG. 4 is a schematic diagram of a matrix-addressable field emission display.

Referring now to FIG. 4, the new space-efficient pixel control circuit is shown incorporated in an abbreviated, exemplary matrix-addressable monochrome field emission display. Four row lines (RL1 through RL4) are matrixed with six column lines (CL1 through CL6). A row shift register 41 is fed a vertical synchronization signal VS and a row clock signal RCLK, which causes the shift register 41 to activate each row line in succession. After all row lines have been swept, the process is repeated in response to a new VS pulse. A column shift register 42 is fed a horizontal synchronization B signal VH, a dot, or column clock signal DCLK, and an inverted column video signal SC*. In response to these inputs, the column shift register 42 places the inverted column video signal SC* on each of the column lines in succession. After all column signal lines have been swept, the process is repeated in response to a new VH pulse. The inverted video signal SC* varies between 0 and about +4 volts, with the voltage of this signal during a column register shift being inversely proportional to the illumination required for the pixel selected by the intersection of an active row and an active column line. Each column line CL1 through CL6 is precharged prior to the activation of each row line. The precharge circuitry 43 is activated by a precharge signal SP that is a function of the row clock signal RCLK, but that is out of phase therewith. Each column line is precharged by a precharge path associated therewith after each shift of the row register 41. It will be noted that pixel illumination is dependent entirely upon pixel phosphorescence once the pixel has been activated, as pixel activation lasts only as long as a row clock signal pulse. It should be well understood that for a color implementation of this architecture, it is necessary to utilize three sets of such circuitry: one for each of the three dots (i.e., red, green and blue) required to form a color pixel. For color implementation, the grid is common to all three sets of circuitry.

Although only a single embodiment of the invention has been disclosed herein, it will be obvious to those having ordinary skill in the art that changes and modifications may be made thereto without departing from the scope and the spirit of the invention as hereinafter claimed.

What is claimed is:

1. A field emission display comprising:

multiple row lines, each of said row lines carrying a digital logic signal;

a row sweep circuit for periodically activating each row line in succession;

multiple column lines, each of said column lines carrying an analog inverted-video signal, said row lines intersecting said column lines;

a column video circuit for periodically coupling successive values of an inverted video signal t each successive column line, said inverted video signal being an analog voltage which is inversely proportional to pixel illumination;

a grid which is common to the entire display, said grid being held at a potential, and said grid having a plurality of apertures; and a plurality of pixels arranged in a matrix of rows and columns, each pixel being located at an intersection of said row lines and said column lines, wherein each pixel includes at least one field emission cathode located adjacent one of said grid apertures, a field-effect transistor having a gate electrode and a source-to-drain channel, the gate electrode being connected to the row line which intersects the pixel, and a resistor, wherein the resistor and transistor are connected in series between the field emission cathode and the column line which intersects the pixel, so that the pixel has a brightness which is proportional to the voltage drop across the resistor and which is inversely proportional to the value of inverted video signal on said column line;

wherein each pixel's only connection to other portions of the display is its connection to the row line and the column line which intersect at that pixel.

2. The display of claim 1, wherein said inverted video signal varies between ground potential and a second potential, said second potential being greater than ground potential but less than said grid potential.

3. The display of claim 1, wherein said transistor is an N-channel insulated-gate device.

4. The field emission display of claim 1, wherein said grid is maintained at a constant first potential, the at least one field emission cathode is maintained at a potential greater than a second potential during periods of pixel inactivation, said first potential minus said second potential being equal to a field emission threshold potential for the field emission cathodes, the at least one field emission cathode being maintained at a potential less than said second potential during periods of pixel activation.

5. The field emission display of claim 4, wherein said transistor in each pixel is an N-channel device, and said analog voltage varies between ground potential, which corresponds to maximum field emission and maximum pixel illumination, and a first positive voltage, which corresponds to a condition of suppressed field emission and no pixel illumination.

6. The field emission display of claim 5, wherein said first positive voltage is no greater than 5 volts.

7. The field emission display of claim 6, wherein said digital logic signal on each of said rowlines alternates between ground potential and a second positive voltage.

8. The field emission architecture of claim 7, wherein said second positive voltage is no greater than 5 volts.

* * * * *